US005532714A

United States Patent [19]

Knapp et al.

[11] Patent Number: 5,532,714

[45] Date of Patent: Jul. 2, 1996

[54] METHOD AND APPARATUS FOR COMBINING VIDEO IMAGES ON A PIXEL BASIS

[75] Inventors: Benjamin P. Knapp, Byron Center, Mich.; Clifford H. Kraft, Naperville, Ill.

[73] Assignee: SPX Corporation, Muskegon, Mich.

[21] Appl. No.: 287,467

[22] Filed: Aug. 8, 1994

Related U.S. Application Data

[63] Continuation of Ser. No. 918,286, Jul. 22, 1992, abandoned.

[51] Int. Cl.[6] ............................ G09G 1/28; H04N 5/272

[52] U.S. Cl. ............................ 345/114; 348/591

[58] Field of Search ............................ 345/113, 114, 345/115, 116, 110, 200, 187, 196, 197; 348/584, 585, 587, 588, 589, 590, 591; 395/152, 150; H04N 5/262, 5/272, 9/74

[56] References Cited

U.S. PATENT DOCUMENTS

| | | | |
|---|---|---|---|
| Re. 33,922 | 5/1992 | Kimura | 340/734 |
| 3,786,476 | 1/1974 | Graves et al. | 340/324 |
| 4,149,152 | 4/1979 | Russo | 340/703 |
| 4,464,656 | 8/1984 | Nakamura | 340/728 |
| 4,634,970 | 1/1987 | Payne et al. | 324/121 |
| 4,677,432 | 6/1987 | Maeda et al. | 340/728 |
| 4,682,297 | 7/1987 | Iwami | 345/113 |
| 4,684,936 | 9/1987 | Brown et al. | 340/721 |
| 4,700,227 | 10/1987 | Liebel et al. | 358/139 |
| 4,710,767 | 12/1987 | Sciacero et al. | 340/723 |
| 4,712,099 | 12/1987 | Maeda | 340/701 |
| 4,772,881 | 9/1988 | Hannah | 340/701 |
| 4,849,746 | 7/1989 | Dubner | 340/728 |
| 5,043,923 | 8/1991 | Joy et al. | 395/152 |
| 5,057,826 | 10/1991 | Soethout et al. | 340/728 |
| 5,185,858 | 2/1993 | Emery et al. | 395/155 |

OTHER PUBLICATIONS

Pixel Semiconductor CL–PX2080 Multi Media DAC Chip.

*Primary Examiner*—Steven Saras
*Attorney, Agent, or Firm*—Kinney & Lange

[57] ABSTRACT

A method and apparatus for raster-scanned video graphics systems where clocked digital video words from a plurality of sources are combined so that, at each video clock time, a word is chosen from one of the ports to light the current pixel on a display. There is an input port for each video source and a gate associated with each input port for passing or inhibiting a binary word. A decision at each video clock time chooses a word from one of the ports and passes it to an output port which leads to a video display or palette device. This decision is based on the data content of the current digital video words at the input ports.

3 Claims, 4 Drawing Sheets

METHOD AND APPARATUS FOR COMBINING VIDEO IMAGES ON A PIXEL BASIS

This is a continuation of application Ser. No. 07/918,286, filed Jul. 22, 1992 now abandoned.

BACKGROUND OF THE INVENTION

1. Field of the Invention

This invention relates generally to raster-scanned video graphics systems found in personal computers and work stations and particularly to a method and apparatus which allow a plurality of digital video sources to write pixels to a video display so that the values of the digital video words themselves determine which source the current pixel will come from. Such raster-scanned video graphics systems may include Extended Graphics Adaptor (EGA), Video Graphics Array (VGA), Super Video Graphics Array (Super-VGA), and others. These systems normally operate on the principle of clocking four to eight bit binary words from a display memory at the video clock rate of the display monitor. Each digital word represents one pixel on the raster of the monitor screen. The binary value of the clocked word usually addresses a register in an intermediate palette device. A system with four bit digital words can select up to sixteen palette registers; a system with eight bit digital words can select up to two hundred fifty six palette registers, etc. Each palette register contains a code representing a color in a color system or a shade of gray in a monochrome system to be displayed as the current pixel on the monitor. The clocked stream of digital words thus creates a stream of pixels to the monitor, each of possibly a different color.

2. Description of the Prior Art

The above described systems involve a single video memory containing words representing pixels on the display screen. Problems arise when there are multiple units of hardware that need to write pixels to the same display. Prior art teaches that, in order to place pixels from a secondary application on a display monitor so that they appear to overwrite areas of the display, the secondary application must preempt entire blocks or regions of pixels from the primary application. These regions are called windows and must be totally dedicated to the secondary application. They are usually manipulated by hardware switches that actually switch the display to a secondary source when the raster scan reaches a pre-defined position. Multi-media graphics systems allow various secondary hardware sources of pixel data to define windows of variable size and position. However, the secondary source must define the pixel values for every pixel in its window. While various windows can overwrite one-another either partially or totally, their priority is fixed so that a certain hardware source has a certain priority with respect to the other sources.

These systems do not allow an arbitrary pattern of selected pixels from a secondary application to apparently overwrite a background pattern except in a fixed window. Decisions as to where the window pixels will appear are made solely on the basis of position on the screen rather than data content and are not performed at the video clock rate of the system. Such multi-media applications allow the combining of two or more images on the same display screen where typically, one is the output of a computer graphics adaptor such as a VGA, and the other is a video source such as a laser disk. The laser disk provides "movie like" images with frames that are accessible randomly.

Such a system allows the user to define a window area in which to put the video from the other source. The system simply detects whether the raster scan position is in the defined area or out of it and routes the video information accordingly. A major drawback of such systems is that all of the data in the window must be provided by the video source designated for that window. The prior art does not teach how to display images from alternate video sources by apparently overlaying pixels that are from a lower priority image.

Several methods are known to place and manipulate isolated image patterns such as oscilloscope traces on a raster-scanned CRT tube or monitor. For example, Soethout et al. in U.S. Pat. No. 5,057,826 teach the placing of single pixels on television screens to form an oscilloscope image; however, the digital image data comes from a single source. Their method can display multiple waveforms at different screen positions, but there is no possibility of any background pattern. Brown et al. in U.S. Pat. No. 4,684,936 present alphanumeric and graphic data at different resolutions on the same display, but at different positions. Liebel et al. in U.S. Pat. No. 4,700,227 teach a method for producing a video signal representing a measuring signal that uses an analog filter to improve video quality. Brown et al. and Liebel et al. do not combine data from multiple sources.

Dubner in U.S. Pat. No. 4,849,746 provides smooth scrolling of a video image across a video display device. Nakamura in U.S. Pat. No. 4,464,656 samples an analog waveform and displays an interpolated pixel pattern as a continuous line on a video display with no background. Payne et al. in U.S. Pat. No. 4,634,970 teach the use of three display memory planes independently addressable to accommodate the difference between the data acquisition rate and the raster scan rate. Nakamura and Payne et al. do not address the problem of multiple video sources.

Graves et al. in U.S. Pat. No. 3,786,476 display acquired data from at least four sampled analog channels on a CRT display at the same time. However, the various channels are assigned different parts of the screen and never overwrite one another. They also teach the placing of alphanumeric characters near the waveform displays at fixed locations on the screen. The channel displays never overwrite the alphanumeric data, but they can move horizontally to continually update with new data.

The prior art fails to teach that digital video data from multiple sources can be combined on a pixel by pixel basis at video clock rates with routing decisions based on the data content of the current word from one or more of the sources. The present invention fills this gap and provides a much needed function in the field of digital video graphics. It particularly concerns a method and apparatus for combining clocked digital video words from a plurality of video sources in such a manner that a word from one of the sources is routed at each clock time to a digital raster-scanned video display or a palette device that controls such a display. The binary values of the words from the sources, in addition to specifying a color or shade of gray, determine which word will be routed to the display at each clock time. The purpose and utility of the present invention is to display graphics images from multiple sources in such a manner that it appears to an observer that data from one or more of the sources overwrites data from other sources in different parts of the display. This has the effect of apparently overlaying images in a complex manner.

Using the present invention, it is possible, for example, for a personal computer to supply a background pattern to an entire display, while a data source such as a digital oscilloscope can appear to overwrite the background with a typical oscilloscope trace. However, because the video words themselves determine which source will supply the current clocked pixel to the display, it is possible to also allow the computer to apparently overwrite the oscilloscope trace in selected parts of the display. This is useful if certain parts of the trace must be marked or annotated. The entire oscilloscope waveform can be provided without concern about the image underneath. The region of the display allocated to the oscilloscope can be filled with "empty pixels," ie. pixels that the invention will not route to the display (because they contain a certain binary value like zero for example) by the oscilloscope video data source in an associated video memory. Then the oscilloscope trace pattern can be written into this memory replacing "empty pixels." The present invention routes pixels from the oscilloscope pattern to the display overwriting the background supplied by the personal computer only with the oscilloscope trace because the "empty pixels" do not overwrite the background. This method allows complex backgrounds, for example, logarithmic graticules or even animated images, to be provided by the personal computer or other video source while eliminating the need for time consuming read-modify-write operations when placing the pixels of the waveform. The invention is not limited to the application in this example, but can combine data from any number of video sources from various applications. The invention works in conjunction with personal computer graphics systems including, but not limited to, EGA, VGA, SuperVGA and similar systems well known in the art for both color and monochrome monitors.

SUMMARY OF THE INVENTION

The present invention comprises a plurality of video input ports that represent video sources, a gate for each input port that either passes or inhibits the binary value from that input port, an output port that transmits video data to a display or palette device, and a decision means for reading the binary values at each gate and deciding which gate should pass its binary value to the output port.

The invention overcomes the drawbacks of previous video graphics systems by allowing video data from a plurality of video sources to concurrently write to a video graphics display. Decisions are made as to which video source will light the current pixel on a pixel by pixel basis at the video clock rate based on the content of the video data itself. Numerous decision rules are possible. These include, but are not limited to, simple prioritizing of the words, comparing the words against fixed values with simple logic gates or a digital comparator, or using the words as addresses into a memory to look up the decision. The action is continuous in the sense that, at every video clock time, each input port presents a new word to its corresponding gate, a new decision is made, and one of the gates allows its word to pass to the display or palette. This permits one application to display an image, possibly a background pattern, while other applications, such as a test instruments, can apparently overwrite that background and each other. The fact that pixel decisions are based on the data content of the video data words themselves allows data from different sources to have priority for different pixels in the raster. Display patterns can thus appear to overwrite each other in a complex manner. The invention solves the problem of combining image data from multiple video sources in graphics display systems.

BRIEF DESCRIPTION OF THE DRAWINGS

For a more complete understanding of this invention, reference should now be made to the embodiments illustrated in greater detail in the accompanying drawings and described below by way of examples of the invention.

Figure 1:
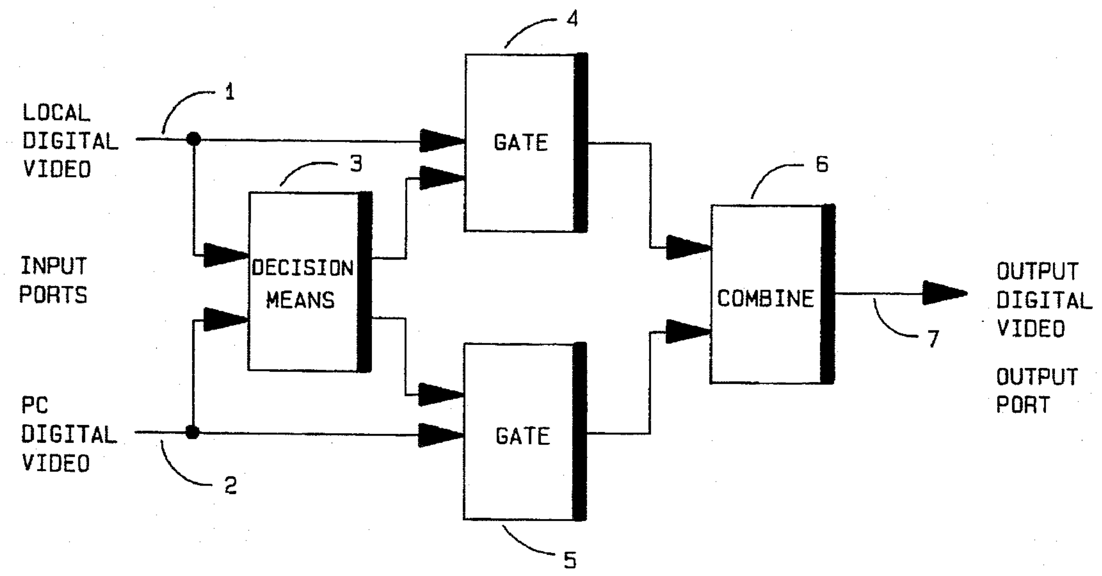
FIG. 1 is a block diagram of the invention for a situation where there are two digital video input ports.

It should be understood, of course, that the invention is not necessarily limited to the particular embodiments illustrated herein.

DESCRIPTION OF PREFERRED EMBODIMENTS

The present invention is concerned with the case where there is a plurality of clocked sources of digital video binary words, usually from multiple display memories. The binary words enter the apparatus through digital video input ports from the binary sources. The input ports receive the binary words for the video sources and could consist of input buffers, latches, direct connections, or any means for receiving binary words. The invention gates the digital words and chooses a word from one of the input ports for each pixel. The chosen binary word is passed to an output port that is connected to a video display or palette device. The output port could be a set of buffers, latches, direct connections or any other means of passing binary words.

The gating decision is made on a pixel by pixel basis from the contents of the data words themselves. Thus, in addition to specifying a specific palette register (and hence a specific color), the words also provide gating information. The decisions may be made by simple logic gates, a digital comparator, or they may looked up in a read-only memory (ROM) or a random access memory (RAM). In the case of multiple video data sources, the lookup memory provides a system with the most flexibility. Of course, the memory must be able to operate at the video clock rate of the system.

In systems where the current digital word does not directly address a color or shade of gray, but rather addresses a palette register which contains the code for a certain color or shade of gray, the contents of the current digital word can be used to make the gating decision either independently of exact color chosen or coupled with color chosen for the current pixel. Whether the decisions are coupled or independent of colors (or shades of gray) depends on the particular programming of the palette registers. In the coupled mode, a given color from one of the sources could always be given higher priority. For example, in one possible scheme, digital words from an external source could be gated for display (using whatever colors they specify) unless they are zero, in which case, words from the lower priority source, say a personal computer, would be gated to the display. However, if the personal computer transmitted a word that corresponded to some particular color, say the color red for example, the current pixel from the personal computer would be displayed. To the user, the color red from the personal computer would always have priority, where other colors (palette addresses) would not. In the independent mode, there would be no direct relationship between colors and priority.

The invention can be constructed from discrete logic elements such as TTL, ECL, or CMOS integrated circuits, or it can be part or all of a large scale or medium scale integrated circuit (LSI or MSI). It can also be made from a commonly available programmable device such as a PAL or PLD. Examples of such a devices are the PLD22V10 series of programmable logic devices manufactured by Cypress Semiconductors of San Jose, Calif. The invention could also be part of a custom semiconductor device such as an ASIC, or made from discrete transistors in either digital or analog configuration. The function of the invention can be performed by a fast programmed microprocessor, a digital signal processor (DSP) or by a programmed computer. The exact choice of construction is dictated by the needs and speed requirements of the application.

Referring now to the drawings, FIG. 1 illustrates the invention cooperating with two sources of digital video words. Digital video input port 1 could originate from some external device such as a digital oscilloscope. Digital video input port 2 could originate from the video memory of a personal computer. Each video source could have a different word width. Each source is docked at the video clock rate of the system, and the sources are synchronized to the same video clock. Thus words appear at each input port at the same time.

The input port 1 is connected to the gate means 4 whose function is to either pass or inhibit digital words from this input port. Electrical connections provide a means of transmitting binary words from the input ports to the gates. The gate means 4 can be made from a plurality of conventional logic gates, digital or analog switches, or any other means known to pass or inhibit electrical signals. The input port 2 is connected to the gate means 5. The gate means 5 is identical in function to the gate means 4, except that, if it is made from a plurality of conventional AND gates, the number of actual gates may be different if the two sources have different digital word widths.

Both digital input ports 1 and 2 also are connected to the decision means 3. The function of the decision means 3 is to examine the binary values of the current words from the digital sources 1 and 2 and decide which word should pass to the output port to light the current pixel on the display screen. The decision means 3 may consist of a simple logic gate, a digital comparator, or a more complex priority arrangement such as a memory for determining which input port the current digital video word should come from. Embodiments that use a memory could use either a read-only memory (ROM) or a random access memory (RAM), both well known in the art, to look up decisions based on the current values of the video words.

The gates 4 and 5 are responsive to the decision means 3 and thus, in combination, pass either the current digital word from the input port 2 or the current digital word from the input port 1. The outputs of the gates 4 and 5 are connected to the inputs of a combining circuit 6; however only one of these connections transmits a current digital word because of the action of the gate means 4 and 5. The function of the combining circuit 6 is to transmit the selected digital word to the output digital video port 7 and then to the display or palette device. This combining circuit can be made from a plurality of conventional logic gates well known in the art. The combining circuit 6 is shown for completeness and would be used in most logic implementations of the invention. However, this circuit is not essential to the invention and only serves to provide isolation. It is very possible with certain types of logic such as ECL or open-collector TTL, to omit this element and simply connect the output of gates 4 and 5 together. It should be noted that a new decision and selection is performed for each new digital word representing a pixel on the raster of the display screen at the video clock rate as the screen is scanned.

Figure 2:
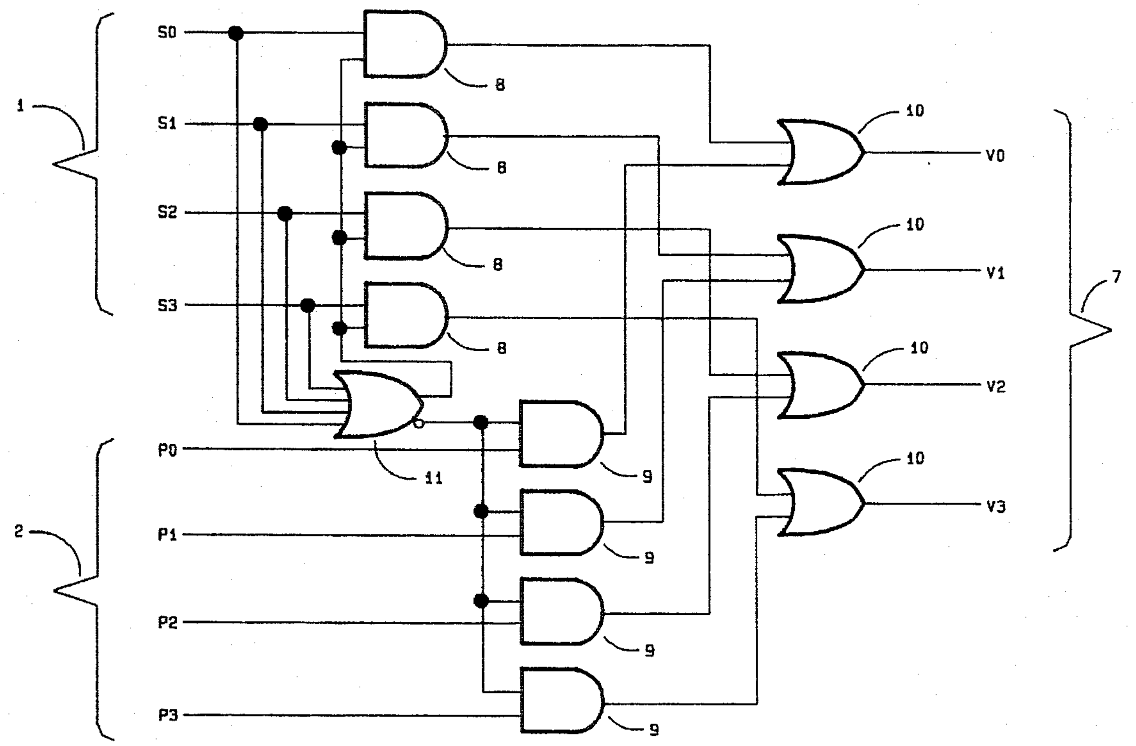
FIG. 2 is a logic diagram of one embodiment of the invention with two digital video input ports, each with word length of four bits. In this case, one of the ports has priority, except when its digital word is zero. In this example, the decision means is an OR gate.

FIG. 2 shows a logic circuit that combines two sources of digital video, both of four bit digital word width as an example of one possible embodiment of the invention. The digital video input port 2 is connected to the four AND gates 9. The digital video input port 1 is connected to the four AND gates 8 and to OR gate 11. The OR gate 11 is a decision means that determines whether the current digital word from the input port 1 has the binary value of zero. If it does, the OR gate 11 enables the AND gates 9 and disables the AND gates 8. If it does not, the OR gate 11 disables the AND gates 9 and enables the AND gates 8. The gates 8 and 9 are thus responsive to the decision made by the OR gate 11. The set of four OR gates 10 act to combine or merge the two data paths from the gates 8 and 9. Only one path transmits the current digital video word chosen by the gate 11. The other path contains a null value. The OR gates 10 pass the chosen digital video word to the digital video output port 7 which is connected to the display or palette device.

Comparing FIG. 2 with FIG. 1 it can be seen that the OR gate 11 in FIG. 2 corresponds to the decision means 3 in FIG. 1. The AND gates 8 and 9 in FIG. 2 correspond to the gates 4 and 5 respectively in FIG. 1, and the OR gates 10 in FIG. 2 correspond to the combining circuit 6 in FIG. 1.

It can be seen from FIG. 2 that a further decision could be made from input port 2 in order preempt the decision made by the OR gate 11 if a certain pre-chosen bit in the current word from input port 2 is set, or if the binary value of the word from the input port 2 is equal to a predetermined value. The circuit to accomplish this is not shown in FIG. 2; however, it could be accomplished with another parallel path into OR gates 10, the decision being made by a digital comparator, a memory or by additional logic gates.

A logic circuit similar to that depicted in FIG. 2 can be programmed in a programmable logic device (PLD) such as the PLD22V10 manufactured by Cypress Semiconductors of San Jose Calif. The following logic equations represent one possible programming arrangement of such a device.

```
SINPUT=[S3,S2,S1,S0]

SCINPUT=[0,0,0,0,S3,S2,S1,S0]

PCINPUT=[P7,P6,P5,P4,P3,P2,P1,P0]

OUTPUT=[V7,V6,V5,V4,V3,V2,V1,V0]

OUTPUT=(SCINPUT*(SINPUT not equal 0))+
   (PCINPUT*(SCINPUT equal 0))
```

The symbol * represents the boolean AND operation, the symbol + represents the boolean OR operation, and not() represents boolean negation. Terms contained within square brackets [ . . . ] are input or output vectors and refer to groups of input or output terms taken as binary words. The symbols S3, S2, S1, and S0 represent the individual binary bits at one input port, and the symbols P7, P6, P5, P4, P3, P2, P1, and P0 represent the binary bits at the other input port. The symbols V7, V6, V5, V4, V3, V2, V1, V0 represent the binary bits at the output port. This programmed embodiment combines the current eight bit clocked word at the first digital video input port PCINPUT from a source such as a personal computer VGA or EGA circuit with the current four bit clocked word from the second digital video input port SINPUT from an external video source such as a test instrument. If all four bits of the current input word from the external source represented by the vector SINPUT are zero, the eight bit current word from the personal computer represented by PCINPUT is selected and allowed to pass to the display or palette. If any of the four bits of the current input word from the external source represented by the vector SINPUT is not zero, the eight bit vector SCINPUT (representing SINPUT in the four lower order bits and zero in the four higher order bits) is selected and allowed to pass to the display or palette. The logic equations shown above may be clocked (registered) or non-clocked (combinatorial) depending on the requirements of the application. The decision whether or not to register the output data is determined by system timing constraints. The preferred method is usually to register the output. This has the effect of delaying the output digital video stream by one pixel, but usually leads to a more stable configuration.

Similar, but slightly more complex, equations may developed for the case where some attribute of the current video word from the personal computer allows that word to always be selected. For example the following equations perform the same function as the previous set but allow the word from the personal computer to always be selected when its high order bit P7 is set to a logical one value regardless of the value of current word from the external source:

SINPUT=[S3,S2,S1,S0]

SCINPUT=[0,0,0,0,S3,S2,S1,S0]

PCINPUT=[P7,P6,P5,P4,P3,P2,P1,P0]

OUTPUT=[V7,V6,V5,V4,V3,V2,V1,V0]

OUTPUT=(SCINPUT*(SINPUT not equal 0)*not(P7))+
(PCINPUT*(SCINPUT equal 0)+P7)

The equations given in these examples represent ways the invention can be embodied in a programmable device. The scope of the invention allows many other possible equations that implement different decisions, different word width, and different numbers of input ports, based on the the needs of the application.

Figure 3:
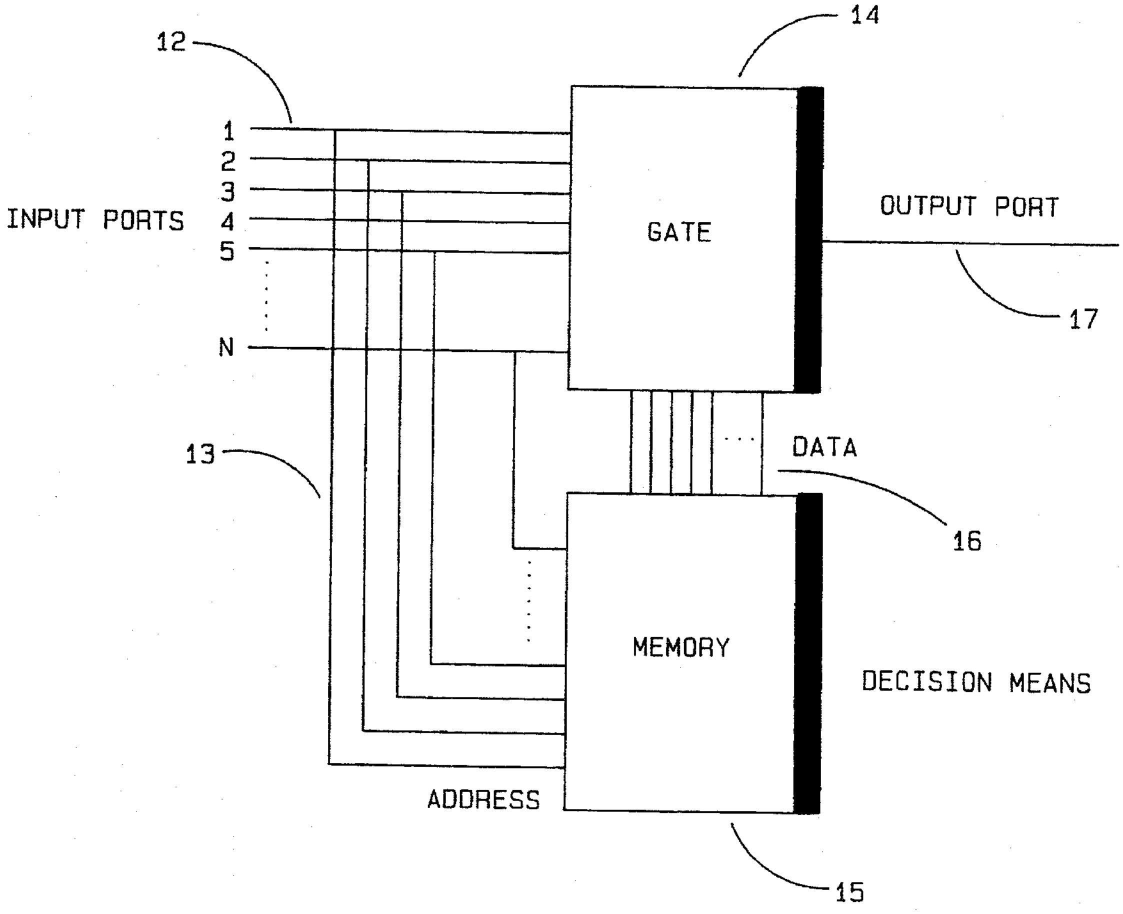
FIG. 3 is a block diagram for a situation where there are N digital video input ports. Decisions in this example are made by using the binary values of the words as addresses into a memory where the decision is looked up.

Referring again to the drawings, FIG. 3 is the block diagram of a system that makes decisions by looking them up in a memory. The current video data words from N video data input ports 12 are used to address a memory 15 where N is a positive integer. The memory 15 can be a read-only memory (ROM) or a random access memory (RAM) programmed to provide the desired selection decisions. The input ports 12 also connect to the gate 14. The function of the gate 14 is identical to that of the gates 4 and 5 in FIG. 1 except that it can gate N input data sources. The data outputs from the memory 15 are connected to the control inputs of the gate 14. The gate 14 is responsive to its control inputs, and hence to the data outputs 16 from the memory, to allow the current word from only one of the input ports 12 to pass to the digital output port 17 and hence to the display or palette. It is important to note that the digital word widths of the various input sources need not be the same as long as each is less than or equal to the word width of that of the digital output port 17. The gate 14 can be made from a plurality of logic gates, such as AND gates, well known in the art or from digital or analog switches or other known means for passing or inhibiting electrical signals.

Figure 4:
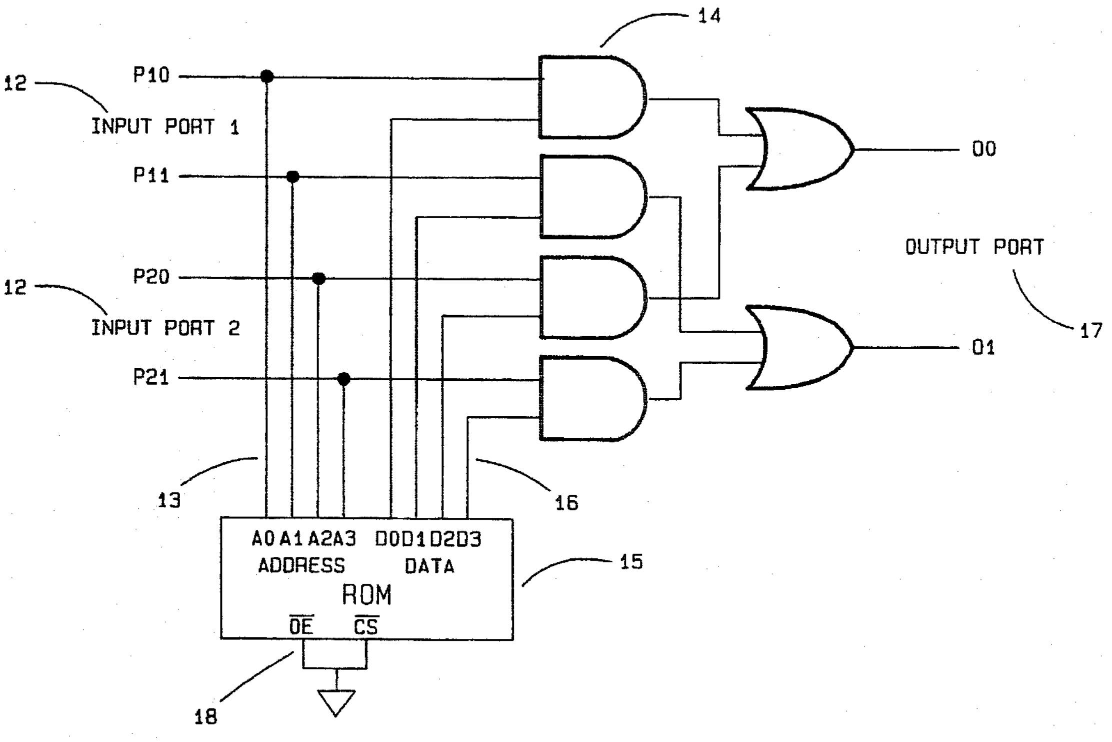
FIG. 4 is a schematic drawing of the situation from FIG. 3 where N equals two, and each input port passes two bit digital words. The memory in this figure is a read-only memory (ROM).

FIG. 4 is a schematic diagram of the system shown in FIG. 3 where N equals two, and the memory is a ROM. Each of the two input ports 12 handle digital word widths of two bits. These binary bits are electrically connected to transmit digital words from the input ports to the decision means 15 which is a read-only memory (ROM) via its address inputs 13. Here there are four address lines, hence the ROM contains a total storage of sixteen values. Each stored value is a four bit word. These values are routed through the data outputs 16 of the ROM to the control inputs of the gates 14. The individual bits from the input ports 12 are connected to the data inputs of the gates 14. The stored values in the ROM determine which of the gates 14 will pass their binary bits to the output port 17, and hence on to the display. The gates include AND gates and OR gates and are electrically connected to transmit binary words to the output port. It should be noted that the stored values in the ROM must be such that either the video word from the first input port is passed or the video word from the second input port is passed. Thus, with data arranged as [D3,D2,D1,D0], only the values [1100] or [0011] can be stored in the ROM for a valid decision. The value [0000] could be stored if it desired to present the binary value of zero to the palette for some combination of data bits at the input ports. This could be used to prevent the word from either input port from passing for certain prechosen data combinations. The output enable and chip select pins of the ROM 18 are shown grounded on this diagram. For most ROM devices, this connection enables it for data reads; however some ROM devices use different arrangements. The circuit shown in FIG. 4 is combinatorial, and hence delays the data words by the ROM read delay. As previously mentioned, it is possible to clock the data from the output port into a latch before passing it on to the palette or display. The circuit of FIG. 4 is representative of the type of decision means where the decision is looked up in a memory. While only two bits of data are shown in each port, it is understood that this embodiment is not limited to two bits and can be extended to any number of bits in either port. Also, the number of bits at the two different ports does not have to be the same.

It is apparent from the foregoing description that there are many possible embodiments within the scope and novelty of the invention. The invention allows the digital video designer to tailor a priority system uniquely suited to his display application. It is to be understood that the above-described arrangements are merely illustrative of the application of the principles of the invention, and that other arrangements may be devised by those skilled in the art without departing from the spirit and scope of the invention.

We claim:

1. An apparatus for combining digital words from clocked digital video sources comprising:

a plurality of input ports for receiving digital words with binary values, said binary values determining the color of a pixel to be displayed, each port coupled to a source of digital words;

a gate associated with each input port for passing or inhibiting a digital word;

means for transmitting digital words from said input ports to the gates;

decision means comprising a plurality of decision rules for reading the binary values of the words at each input port at each pixel clock time and deciding which gate should pass its corresponding word, a decision rule being chosen from said plurality of decision rules at each pixel clock time, the decision rules making decisions at said pixel clock time based on the binary values of the digital words;

an output port for passing digital words to a video display or palette;

means for transmitting the digital words from the gates to said output port.

2. An apparatus according to claim 1 wherein the decision means is a plurality of comparators a particular comparator chosen at each pixel clock time.

3. An apparatus according to claim 1 wherein the decision means is a read-only memory (ROM) or a random access memory (RAM) with digital words from the input ports used to address said memory and choose decision rules contained in said memory.

* * * * *

UNITED STATES PATENT AND TRADEMARK OFFICE

CERTIFICATE OF CORRECTION

PATENT NO. : 5,532,714

DATED : JULY 2, 1996

INVENTOR(S) : BENJAMIN P. KNAPP, CLIFFORD H. KRAFT

It is certified that error appears in the above-indentified patent and that said Letters Patent is hereby corrected as shown below:

Col. 5, line 13, delete "semiconductor", insert --semi-conductor--

Col. 5, line 26, delete "docked", insert --clocked--

Col. 7, line 46, delete "width", isnert --widths--

Signed and Sealed this

Twenty-sixth Day of November 1996

Attest:

BRUCE LEHMAN

*Attesting Officer*

*Commissioner of Patents and Trademarks*